3,359,181
PROCESS FOR PREPARING A PROTECTIVE
COATING
James L. Peterson, Idaho Falls, Idaho, assignor to The
Joyce Corporation, Pocatello, Idaho
No Drawing. Filed May 7, 1965, Ser. No. 454,220
1 Claim. (Cl. 106—14)

This invention relates to the process of manufacturing and resulting composition of a protective coating to be applied while in the liquid state to a surface.

The principal ingredient of this protective coating is the mineral elaterite. This material is found in Utah. As mined, it has the appearance of anthracite and the feel of a very heavy tar or asphalt. Elaterite is of hydrocarbon composition and is a type of bitumen. It is currently not mined commercially.

A chemically related mineral also mined in Utah is gilsonite, named after S. H. Gilson of Salt Lake City. A less frequent name for the mineral is uintaite, derived from the Uinta Valley in Utah. This mineral was once used extensively in printer's ink. Over the years, the better quality deposits have become depleted. The mineral is still mined and used as thermal insulation.

The first step in the manufacture of my protective coating is purifying the elaterite. I do this by heating the elaterite to remove substances which boil below about 300° F. The elaterite may be held at any temperature from about 250° F. to the temperature at which degradation of the elaterite occurs. The higher temperatures lead to faster processing as well as allowing more of the higher boiling impurities to be removed. However, degradation of the elaterite occurs when the temperature of the elaterite goes much above 312° F.

Following the purifying step, I drop the temperature preparatory to adding thinner. The thinner vaporizes during this range so the temperature of the elaterite should be as low as possible while keeping it in the liquid state. This promotes rapid homogenization of the elaterite and the thinner.

I have found two aromatic hydrocarbons suitable, among them benzene, and xylene. Other closely related chemical compositions can also be expected to work equally well. Sufficient thinner must be added to keep the composition in the liquid state at ambient temperature. I have found a range of from 30% to 70% thinner of the total suitable. The particular end product will determine the proper amount of thinner as well as drier to be added. Different viscosities are required for brushing or spraying, for instance.

The time required for full homogenization is somewhat dependent on temperature of the mixture. Vigorous agitation and mechanical mixing is also useful.

Following the treatment with thinner, the composition should be filtered to remove any remaining slag or other impurities.

If desired, a conventional drying agent may be added. Best results to date have been obtained with a natural drier, for example, japan drier.

The composition may be applied by conventional means to any surface, e.g., wood, metal or plastic, needing protection against salt or acid corrosion. Although a substitute for paint, my composition is much more than a paint because of its corrosion resistance.

By way of further description, the following specific example shows the process and composition as actually made by me during early experiments.

Elaterite ore from a clean vein was chipped out and heated in a home pressure cooker. The pressure cooker was equipped with a pressure gauge and adjustable relief valve. The ore was heated at an indicated pressure of 40 p.s.i. with the distillate escaping from the relief valve. After about three-and-one-half hours, the amount of escaping distillate diminished and the pressure dropped. The cover was removed and the temperature of the liquid elaterite was measured at 312° F.

The temperature was allowed to decrease to 200° F. at which point the cover was replaced. Ortho xylene, equal in weight to the elaterite ore, was then added. The pressure rapidly increased due to the partial vaporization of xylene whose boiling point is 291° F. The pot was continuously agitated for approximately an hour while the xylene combined with and homogenized with the elaterite. The solution was then strained to remove solid impurities and cooled to normal temperature. A conventional japan drier equal in weight to the xylene was then added.

When applied to a strip of metal, the composition forms a uniform covering with a dull black surface. Flexing of the metal does not cause cracking of the covering or separation from the metal. The covering composition does not pit, flake off, or otherwise deteriorate with age. I attribute this property to the fact the coating is primarily chemically unaltered elaterite, a composition which has existed in nature for hundreds of millions of years.

The corrosion and electrical resistance properties of elaterite make it useful in many other applications. Among them are the coating of electrical wires and underground cables, and the coating and filling for condensers and transformers.

I have also attempted to make a similar coating using gilsonite. It is much more brittle than elaterite and forms only an inferior coating composition. The gilsonite coating has considerably less adhesion to the surface and considerably less elasticity. Lack of these properties lead to a breaking of the coating and loss of protection.

Having described my invention, I claim:

A method of producing an impervious coating containing elaterite as a major ingredient comprising:
(a) heating elaterite ore at 40 p.s.i. for three and one half hours to a final temperature of 312° F. to vaporize the lower boiling distillates,
(b) lowering the temperature to 200° F. and adding a solvent of orthoxylene in an amount equal to the weight of the elaterite,
(c) agitating the elaterite and xylene for an hour to homogenize them,
(d) straining the homogenized mixture to remove impurities,
(e) cooling the mixture,
(f) adding japan drier to the mixer in an amount equal to the weight of the xylene.

References Cited

UNITED STATES PATENTS

| | | | |
|---|---|---|---|
| 542,086 | 7/1895 | Leathers | 106—278 |
| 768,101 | 8/1904 | Whitall | 106—278 |
| 841,573 | 1/1907 | Ryan | 106—14 |
| 959,663 | 5/1910 | Watt | 106—278 |
| 1,147,971 | 7/1915 | Perry | 106—14 |
| 1,296,776 | 3/1919 | Darrin | 106—278 |
| 1,302,090 | 4/1919 | Reeves | 106—14 |
| 2,270,047 | 1/1942 | Goodwin et al. | 106—278 |
| 2,386,592 | 10/1945 | Canavan | 106—278 XR |
| 2,883,289 | 4/1959 | Furey et al. | 106—14 |

ALEXANDER H. BRODMERKEL, Primary Examiner.

L. B. HAYES, Assistant Examiner.